United States Patent [19]

Okuda et al.

[11] Patent Number: 5,510,397

[45] Date of Patent: Apr. 23, 1996

[54] AQUEOUS PIGMENT INK COMPOSITION FOR WRITING UTENSILS

[75] Inventors: Yasuji Okuda; Hiroaki Ueda, both of Osaka, Japan

[73] Assignee: Sakura Color Products Corporation, Osaka, Japan

[21] Appl. No.: 224,874

[22] Filed: Apr. 8, 1994

[30] Foreign Application Priority Data

Apr. 23, 1993 [JP] Japan .................... 5-098112

[51] Int. Cl.$^6$ ............. C09D 11/10; C08K 13/04
[52] U.S. Cl. ............ 523/161; 523/160; 260/DIG. 38; 524/413; 524/430; 524/502; 524/513; 524/385; 524/389
[58] Field of Search .............. 523/160, 161; 260/DIG. 38; 524/413, 430, 385, 386, 389, 502, 513

[56] References Cited

FOREIGN PATENT DOCUMENTS

| 63-145380 | 6/1988 | Japan . |
|---|---|---|
| 63-145381 | 6/1988 | Japan . |
| 63-145382 | 6/1988 | Japan . |
| 63-243179 | 10/1988 | Japan . |
| 2133479 | 5/1990 | Japan . |

*Primary Examiner*—Paul R. Michel
*Assistant Examiner*—John J. Guarriello
*Attorney, Agent, or Firm*—Oblon, Spivak, McClelland, Maier & Neustadt

[57] ABSTRACT

An aqueous pigment ink composition for writing utensils is provided, which is capable of providing handwritings with good opacifying properties and exhibits little difference in whiteness between handwritings obtained immediately after writing and after drying. When the composition is applied to the inner stick type of writing utensils, an ink having good opacifying properties is passed out. The ink composition comprises, at least, an emulsion of styrene resin-based doughnut-shaped flat particles as a white opacifying agent.

10 Claims, No Drawings

5,510,397

AQUEOUS PIGMENT INK COMPOSITION FOR WRITING UTENSILS

FIELD OF THE INVENTION AND RELATED ART STATEMENT

This invention relates to an aqueous pigment ink composition for writing utensils and more particularly, to an aqueous pigment ink composition for writing utensils which is particularly suitable for use in inner stick-type writing or handwriting utensils.

Conventional aqueous pigment ink compositions generally comprise, as an opacifying agent, white pigments having a large size and a great specific gravity, typical of which are titanium oxide particles, in order to impart opacifying power or opacity to handwritings. However, because of the poor dispersibility of the white pigment, such an ink composition is unlikely to use, for example, as an ink composition for so-called "inner stick-type marking pens" wherein the ink is allowed to pass to the pen point from an ink occluding body through the capillary action. When using a white pigment having a smaller size, the dispersibility in the ink composition becomes better. However, the composition has not good opacifying properties, with the opacity of handwritings being not ensured.

In Unexamined Japanese Patent Publication SHO 63-145380 and SHO 63-145382, for example, aqueous white pigment ink compositions have been proposed in which there are formulated resin particles (or spheres) called a plastic pigment along with titanium oxide or chromatic pigments. Unexamined Japanese Patent Publication SHO 63-145381 has proposed an aqueous black pigment ink composition which comprises resin particles along with carbon black.

In order to solve the above problem, Unexamined Japanese Patent Publication SHO 63-243179 has proposed an aqueous pigment ink composition for utensils which comprises, at least, hollow resin particles (in a specific form) which individually contain water therein and whose shell is formed of an acrylic-styrene copolymer. The hollow resin particles of the aqueous pigment ink composition individually have a shell which contains water therein and is formed of an acrylic-styrene copolymer, and is supplied in the form of an emulsion based on water. Although the resin particles are hollow, they contain water in the inside thereof. The water is evaporated on drying and is replaced by air, so that the hollow resin particles have air included therein. In addition, the hollow resin particles obtained after drying individually keep their hollow particulate shape. Light scattering takes place at the interface between the inner side of the acrylic-styrene copolymer shell layer and air. Accordingly, the particles are observed as white in color when used singly and the opacifying properties are improved on use in combination with other colorants.

Because the hollow particles are smaller in specific gravity than titanium oxide, they are unlikely to settle down, thus leading to good storage stability of the resultant composition. However, since the hollow resin particles develop a white color on evaporation of moisture from the hollow portion, the opacifying properties are not good immediately after writing. More particularly, the color of the particles in the state where moisture is contained immediately after writing differs from the color attained after drying with respect to whiteness.

The hollow resin particles exhibit good dispersibility but are inferior in opacifying properties to, for example, titanium oxide. If the opacifying properties are improved by using the hollow resin particles in combination with titanium oxide, the titanium oxide settles down, resulting in the difference in writing density. Accordingly, it is not possible to use such a composition for inner stick-type utensils, for example.

Writing utensils are broadly divided into two types including an ink-free valve type and an inner stick type wherein an ink is filled in the inner piece of cotton (or inner stick) and is permitted to flow out through the tip. With the former valve type, it is usual to employ the utensils after shaking, so that dispersibility is of little problem. However, with the latter inner stick type of utensil and particularly with writing utensils of the type proposed by us in Unexamined Patent Publication HEI 2-133479 wherein an ink is allowed to flow out from the tip by the capillary action, the above problem can be solved to an extent by using a resin emulsion for hollow particles and a specific type of water-soluble resin as dispersants. The ink consists of a white ink which has good opacifying properties and good dispersibility. However, when such an ink passes out from the inner cotton piece or inner stick, it suffers inevitable filtration through the inner cotton and the tip. This results in the substantial lowerings in concentration of the titanium oxide and hollow resin particles, with the attendant problem that the resultant ink flowing out from the tip has poorer opacifying properties.

OBJECT AND SUMMARY OF THE INVENTION

An object of the invention is to provide an aqueous pigment ink composition for writing utensils which is able to provide handwritings with good opacifying properties and exhibits little difference between the whitenesses immediately after writing and after drying and which allows an ink having good opacifying properties to flow out especially when applied to writing utensils of the inner stick type.

In order to achieve the above object, the invention provides an aqueous pigment ink composition for writing utensils which comprises an emulsion of styrene resin doughnut-shaped, not-hollow, flat particles as a white opacifying agent.

Since the composition of the invention comprises doughnut-shaped flat particles as an opacifying agent, good dispersibility is attained along with good opacifying properties. The composition exhibits good fluidity and good smoothness of writings. The composition can show satisfactory opacifying power when applied not only to the valve type of writing utensil, but also to the inner stick type of writing utensil. Because the doughnut-shaped flat particles are not applied to a paper surface in a state where water is contained in individual particles as with the case of the hollow resin particles set out hereinbefore, little difference appears between the whitenesses attained immediately after writing and after drying. The specific shape of the flat particles contributes to improving the opacifying properties. This is because the particles are microscopically arranged and built up substantially flat in writings. Thus, the flat particles are better in smoothness and gloss than conventional not-hollow spherical particles.

The styrene resin doughnut-shaped, not-hollow, flat particles (hereinafter referred to simply as doughnut-shaped flat particles) are a kind of plastic pigment and can be employed as an opacifying agent capable of developing a white color like hollow resin particles. The specific gravity of the doughnut-shaped flat particles is smaller than that of titanium oxide. Accordingly, the use of the doughnut-shaped flat particles as a white opacifying agent instead of or in combination with titanium oxide leads to the improvement of the opacifying properties of the resultant ink and the weight savings.

The composition of the doughnut-shaped flat particles is not critical provided that they can keep a doughnut and flat shape in an aqueous medium. The manner of preparation is also not critical provided that the doughnut-shaped particles can be formed. For instance, commercial products such as Muticle D Type available from Mitsui-Toatsu Chemical Co., Ltd., can be conveniently used. In general, all the styrene resin-based doughnut-shaped flat particles may be used without limitation. With respect to the size of the doughnut-shaped flat particles, those particles having an outer diameter (major axis) ranging 0.1 to 1.0 μm are usable. Preferably, the outer diameter is in the range of 0.3 to 0.7 μm. If the outer diameter is smaller than 0.1 μm, good opacifying properties are not shown. On the contrary, when the outer diameter exceeds 1.0 μm, the ink is unlikely to pass out from the tip which is a pen point. The thickness of individual flat particles is preferably in the range of approximately ⅓ to ⅔ of the outer diameter. It will be noted that the term "doughnut shape" used herein is intended to mean a circular or analogous shape such as of an oval, a circle or the like and is not limited exactly to a specific one. For instance, the doughnut shape includes a disk or analogous shape not only having a thorough hole at the central portion thereof, but also having a recessed portion at one side or both sides of the central portion thereof. The size of the through-hole or the recess is not critical.

The doughnut-shaped flat particles are generally used, as a solid matter, in an amount of from 0.5 to 40 wt%, preferably from 1 to 20 wt%, based on the aqueous pigment ink composition. If the amount exceeds 40 wt%, the viscosity increases excessively. Especially, when such a composition is applied to writing utensils of the inner stick type, the tip which is a pen point is clogged, thereby causing the failure of the smooth outflow of the ink. In addition, since the content of a water-soluble resin serving as a tackifier is relatively lowered, the adhesion to a writing surface lowers. On the other hand, when the content is less than 0.5 wt%, good opacifying properties are not obtained. This in turn requires a larger amount of white inorganic pigments such as titanium oxide, not leading to the improvement of dispersibility. When the aqueous pigment ink composition is prepared, the doughnut-shaped flat particles may be added as it is. In general, the particles are added in the form of an aqueous emulsion or dispersion. The emulsion of the doughnut-shaped flat particles should preferably be a weakly alkaline emulsion which has a concentration of the doughnut-shaped flat particles of from approximately 40 to 45 wt% as a solid matter, a viscosity of from 15 to 25 cps., and a pH of from approximately 7.8 to 8.3.

In the aqueous pigment ink composition of the invention, the opacifying agent should preferably consist of a mixture of the doughnut-shaped flat particles and a white inorganic pigment such as titanium oxide, zinc oxide or the like. When these white inorganic pigments, particularly titanium oxide, are contained, better opacifying properties are imparted. The content of a white inorganic pigment, such as titanium oxide, in the ink composition is properly selected within a range of from 1 to 40 wt%, preferably from 5 to 30 wt%, depending on the content of the doughnut-shaped flat particles and also in view of the use and opacifying properties of the resultant ink. In general, a high content of the doughnut-shaped flat particles permits a smaller content of titanium oxide.

The aqueous pigment ink composition of the invention usually comprises natural water-soluble polymers or synthetic water-soluble resins (hereinafter referred generically to "water-soluble resins") for use as a tackifier in order to enhance the dispersibility of the opacifying agent in the ink and the adhesion to writing surfaces. Examples of the water-soluble resins include poly(meth)acrylic acid, styrene-acrylic copolymer, styrene-maleic copolymer, polymaleic acid, rosin-modified maleic resins, shellac and the like. These water-soluble resins may be used in the form of alkaline metal salts, ammonium salts, amine salts and the like or may be employed in the form of aqueous resin emulsions and aqueous resin hydrosols.

The water-soluble resin is present in an amount of from 0.1 to 30 wt%, preferably from 1 to 10 wt%, based on the aqueous pigment ink composition. If the amount is less than 0.1 wt%, the dispersibility of opacifying agents becomes unsatisfactory, with unsatisfactory adhesion to writing surfaces. On the other hand, when the amount exceeds 30 wt%, the viscosity increases excessively, thereby causing the failure of the outflow of the ink on application to writing utensils of the inner stick type. The ink composition of the invention may further comprise preservatives, antifungal agents, surface active agents and the like, if necessary.

For the preparation of achromatic or chromatic aqueous pigment ink compositions other than white pigment ink compositions, there are used colorants including achromatic and chromatic inorganic or organic pigments. Such pigments are not critical in type and include, for example, carbon black, and azo, phthalocyanine, quinacridone, anthraquinone, dioxane, indigo, thioindigo, perinone, perylene, isoindolene, azomethineazo and the like pigments. The content of the colorant is in the range of from 0.1 to 30 wt%, preferably from 1 to 15 wt%, based on the aqueous pigment ink composition.

The solvent of the aqueous pigment ink composition may be water or aqueous mediums which are mixtures of water and various water-soluble organic solvents used as a wetting agent and/or a drying promotor. Examples of the water-soluble organic solvent include lower alcohols such as ethanol, isopropanol, butanol and the like, polyhydric alcohols such as ethylene glycol, propylene glycol, glycerin and the like, polyalkylene glycols such as diethylene glycol, triethylene glycol, polyethylene glycol, dipropylene glycol, tripropylene glycol, polypropylene glycol and the like, and alkyl ethers of alkylene glycols such as ethylene glycol monomethyl ether, ethylene glycol monoethyl ether, ethylene glycol monopropyl ether, ethylene glycol monobutyl ether, propylene glycol monomethyl ether, propylene glycol monoethyl ether, propylene glycol monopropyl ether, propylene glycol monobutyl ether and the like. If used, these water-soluble organic solvents are present in the aqueous ink in an amount of not greater than 20 wt%, preferably not greater than 10 wt%.

The ingredients set out hereinabove are weighed in predetermined amounts and are mixed under agitation by a known dispersion machines such as ball mills, homomixers, bead mills, roll mills and the like to obtain a uniform aqueous pigment ink composition of the invention. Where inorganic pigments are used in combination, a composition dispersing the pigments therein is preliminarily prepared. Subsequently, the composition is mixed with an emulsion of doughnut-shaped flat particles at an appropriate mixing ratio.

Since the doughnut-shaped flat particles do not contain water in the inside thereof unlike known hollow resin particles, a white color develops immediately after writing on a paper surface.

In comparison with aqueous pigment ink compositions having the same concentration of hollow resin particles, aqueous pigment ink compositions of the invention which comprise doughnut-shaped flat particles are better in dispersibility with a lower viscosity, resulting in better fluidity of the ink. This means that when inks having similar opacifying properties are filled in writing utensils of the inner stick type, the aqueous pigment ink composition of the invention has a smaller rate of lowering the substantial concentration of the opacifying agent by filtration through the inner cotton and tip. When the ink composition of the invention is applied onto a paper surface, satisfactory opacifying properties are attained with better smoothness and gloss.

DETAILED DESCRIPTION OF THE PREFERRED EMBODIMENTS

The present invention is more particularly described by way of examples.

EXAMPLE 1

Doughnut-shaped flat particles used were styrene resin-based particles having a recessed hole available from Mitsui-Toatsu Chemical Co., Ltd., under the designation of Muticle PP240D. This 240D was in the form of a milky emulsion having a content of doughnut-shaped flat particle with a size of 0.5 μm of 44 wt% as a solid matter (when determined at 150° C. for 20 minutes), a pH of 8 and a viscosity of 20 cps., (when determined at 20° C. under revolutions of 60 rpm).

The water-soluble resin used was a styrene-acrylic copolymer available from Johnson Co., Ltd., under the designation of Johncryl 679 (abbreviated as "Resin A" in Table 1). This resin was used in the form of an ammoniacal aqueous solution containing 34 wt% of Johncryl 679 and 10 wt% of isopropanol.

The white pigment used was titanium oxide available from Titanium Ind. Co., Ltd., under the designation of Kronos KR-380D.

240 D, titanium oxide, Johncryl 679, a surface active agent, propylene glycol and water were formulated in amounts indicated in Table 1, respectively, followed by uniform mixing by use of a bead mill to prepare an aqueous pigment ink composition. The ink composition was subjected to measurement of a viscosity at 25° C. Moreover, the ink composition was applied to an inner stick type of writing utensil by filling in its inner stick portion, followed by evaluation of writing properties, opacifying properties and storage properties according to the procedures set out hereinafter.

EXAMPLES 2 to 6

The general procedure of Example 1 was repeated except that the types and amounts of water-soluble resins, and the contents of 240D, titanium oxide, the surface active agent, propylene glycol and water were, respectively, changed as indicated in Table 1, thereby preparing aqueous pigment ink compositions of Examples 2 to 6 and except that the aqueous ink composition of Example 4 contained a black pigment (CI. PIG. Black 7), the aqueous ink composition of Example 5 contained a red pigment (CI. PIG. Red 57), and the aqueous ink composition of Example 6 contained a blue pigment (CI. PIG. Blue 15) in amounts indicated in Table 1, respectively, thereby obtaining chromatic inks. The water-soluble resins used in Examples 2 to 6 were, respectively, those resins B to F.

Example 2 (Resin B) B-36 available from Johnson Co., Ltd.

Example 3 (Resin C) Hairos X-220 available from Seikou Chem. Co., Ltd.

Example 4 (Resin D) Johncryl 555 available from Johnson Co., Ltd.

Example 5 (Resin E) H-2190 from Seikou Chem. Co., Ltd.

Example 6 (Resin F) Johncryl 67 available from Johnson Co., Ltd.

Among the above water-soluble resins, Resin C was a styrene-maleic copolymer, Resin E was polyacrylic acid, and the others (Resins B, D and F) were a styrene-acrylic copolymer. These resins were all used in the form of an ammoniacal aqueous solution containing 34 wt% of the resin and 10 wt% of isopropanol.

The aqueous pigment ink compositions of Examples 2 to 6 were each subjected to measurement of a viscosity at 25° C. and then evaluated in the same manner in Example 1.

TABLE 1

| Ingredients (parts by weight) | Example 1 | Example 2 | Example 3 | Example 4 | Example 5 | Example 6 |
| --- | --- | --- | --- | --- | --- | --- |
| 240D (solid matter) | 47 (20.7) | 54 (23.8) | 62 (27.2) | 8 (3.5) | 50 (22.0) | 50 (22.0) |
| Titanium oxide | 20 | 10 | 5 | 1 | 7 | 7 |
| Colorants | | | | | | |
| black | — | — | — | 8 | — | — |
| red | — | — | — | — | 6 | — |
| blue | — | — | — | — | — | 6 |
| Water-soluable resins | | | | | | |
| A | 8 | — | — | — | — | — |
| B | — | 10 | — | — | — | — |
| C | — | — | 7 | — | — | — |
| D | — | — | — | 13 | — | — |
| E | — | — | — | — | 18 | — |
| F | — | — | — | — | — | 10 |
| Surface active agent | 1 | 0.5 | 1 | 1 | 0.5 | 1 |
| Propylene glycol | 3 | 3 | 3 | 3 | 3 | 3 |
| Water | 21 | 22.5 | 22 | 66 | 15.5 | 23 |
| Total | 100 | 100 | 100 | 100 | 100 | 100 |

Comparative examples are then described.

COMPARATIVE EXAMPLES 1 to 6

In these comparative examples, there were used, instead of the emulsion of the styrene resin-based doughnut-shaped flat particles, an emulsion of hollow resin particles available from Dainippon Ink Chemical Ind. Co., Ltd. under the designation of Grandol PP-1100, with the hollow resin particles being contained as the solid matter in an amount of 36 wt%.

The general procedure of Example 1 was repeated except that the hollow resin particles were used, instead of the doughnut-shaped flat particles, in amounts indicated in Table 2, respectively, thereby obtaining aqueous pigment ink compositions corresponding to those of Examples 1 to 6, respectively.

These aqueous pigment ink compositions were subjected to measurement of a viscosity at 25° C. and then evaluated in the same manner as in Example 1.

the ink, followed by assessment of the degree by three ranks of ⊚ (no black line observed), ○ (little black line observed), and Δ (black line observed). The storage properties were evaluated by comparing the writing properties and opacifying properties one month after storage of an ink which was kept in an erect or invertedly erect state at 50° C. over one month and prior to the storage. The writing properties were evaluated with respect to the change of the outflow of ink prior to and after the storage and the opacifying properties were evaluated with respect to the change in density of writings prior to and after the storage, each by three ranks of ⊚ (same as in the case prior to the storage), ○ (little change involved prior to and after the storage), and

TABLE 2

| Ingredients (parts by weight) | Comparative example 1 | Comparative example 2 | Comparative example 3 | Comparative example 4 | Comparative example 5 | Comparative example 6 |
|---|---|---|---|---|---|---|
| PP-1100 (solid matter) | 60 (21.6) | 70 (25.2) | 80 (28.8) | 10 (3.6) | 65 (23.4) | 65 (23.4) |
| Titanium oxide | 20 | 10 | 5 | 1 | 7 | 7 |
| Colorants |  |  |  |  |  |  |
| black | — | — | — | 8 | — | — |
| red | — | — | — | — | 6 | — |
| blue | — | — | — | — | — | 6 |
| Water-soluable resins |  |  |  |  |  |  |
| A | 8 | — | — | — | — | — |
| B | — | 10 | — | — | — | — |
| C | — | — | 7 | — | — | — |
| D | — | — | — | 13 | — | — |
| E | — | — | — | — | 18 | — |
| F | — | — | — | — | — | 10 |
| Surface active agent | 1 | 0.5 | 1 | 1 | 0.5 | 1 |
| Propylene glycol | 3 | 3 | 3 | 3 | 3 | 3 |
| Water | 8 | 6.5 | 4 | 64 | 0.5 | 8 |
| Total | 100 | 100 | 100 | 100 | 100 | 100 |

EVALUATION METHODS

The writing properties were evaluated in the following manner: each in was handwritten on a paper surface whereupon the outflow of the ink was evaluated by three ranks of ⊚ (very good outflow of ink), ○ (good outflow of ink), and Δ (likelihood to blur).

The opacifying properties were evaluated by applying an ink onto a black line printed on art paper and visually observing a degree of the black line left after the drying of Δ (outflow or opacifying properties degraded after the storage).

According to the above evaluation methods, the aqueous ink compositions of Examples 1 to 6 and Comparative Examples 1 to 6 were evaluated. The results of the evaluation and the results of the measurement on the viscosity of the respective aqueous ink compositions are shown in Table 3. It will be noted that with respect to the storage properties, no difference was observed between the erect and invertedly erect states.

TABLE 3

|  | Viscosity (CPS, 25° C.) | Writing properties | Opacifing properties | Storage properties (50° C., 1 month) | |
|---|---|---|---|---|---|
|  |  |  |  | Change in writing | Change in opacifying |
| Example |  |  |  |  |  |
| 1 | 17.5 | ○ | ⊚ | ○ | ○ |
| 2 | 13.2 | ⊚ | ⊚ | ⊚ | ○ |
| 3 | 8.8 | ⊚ | ⊚ | ⊚ | ○ |
| 4 | 5.4 | ⊚ | ⊚ | ⊚ | ○ |
| 5 | 14.8 | ⊚ | ⊚ | ⊚ | ○ |
| 6 | 13.7 | ⊚ | ⊚ | ⊚ | ○ |
| Comparative example |  |  |  |  |  |
| 1 | 21 | ○ | ○ | Δ | Δ |
| 2 | 16.5 | ○ | ○ | ○ | ○ |
| 3 | 11 | ⊚ | Δ | ○ | ○ |

TABLE 3-continued

|   | Viscosity (CPS, 25° C.) | Writing properties | Opacifing properties | Storage properties (50° C., 1 month) | |
|---|---|---|---|---|---|
|   |   |   |   | Change in writing | Change in opacifying |
| 4 | 6.2 | ⊙ | Δ | ○ | ○ |
| 5 | 19.4 | ○ | Δ | Δ | Δ |
| 6 | 17.2 | ○ | Δ | Δ | Δ |

RESULTS OF EVALUATION

As will become apparent from Table 3, when the ink compositions of Examples 1 to 6 and Comparative Examples 1 to 6 which, respectively, contain as an opacifying agent the doughnut-shaped flat particle emulsion and the hollow resin particle emulsion at the same levels of concentrations, the viscosities are lower for the compositions of all the examples.

With respect to the writing, opacifying and storage properties, the compositions of the examples are equal to or better than the corresponding compositions of the comparative examples. More particularly, the compositions of the examples are better in the initial opacifying and writing properties than corresponding comparative compositions, with the storage properties being good. One month after the storage, the writing and opacifying properties substantially keep their initial states, respectively.

The change of the opacifying properties in Comparative Examples 2 to 4 are evaluated as ○ like Examples 2 to 4. In this connection, however, the opacifying properties prior to the storage are better in the compositions of the examples than in the comparative examples, so that the opacifying properties after the storage are also better in the examples than in the comparative examples.

Since the aqueous pigment ink composition of the invention comprises the styrene resin-based doughnut-shaped flat particles as an opacifying agent, good dispersibility is ensured along with good outflow of the ink. Thus, the composition can be applied not only to the valve type of writing utensil, but also to the inner stick type of writing utensil and shows satisfactory opacifying power.

The styrene resin-based doughnut-shaped flat particles are not applied onto a paper surface in a state where water is contained in individual particles like hollow resin particles. Accordingly, not only little difference appears in whiteness between the inks immediately after writing and after drying, but also good smoothness and gloss are obtained.

What we claim is:

1. An aqueous pigment ink composition for writing utensils, comprising:
    an emulsion of doughnut-shaped, flat styrene comprising resin particles as a white opacifying agent, having an outer diameter of 0.1 to 1.0 μm and a thickness of ⅓ to ⅔ of said outer diameter.
2. The ink composition as defined in claim 1, wherein said styrene resin-based doughnut-shaped flat particles are in a circular or analogous form.
3. The ink composition as defined in claim 1, wherein said styrene resin-based doughnut-shaped flat particles are provided with a thorough hole at a central portion thereof.
4. The ink composition as defined in claim 1, wherein said styrene resin-based doughnut-shaped flat particles have at least one recessed side at a central portion thereof.
5. The ink composition as defined in claim 1, wherein said styrene resin-based doughnut-shaped flat particles are present in an amount of 0.5 to 40 wt% of said composition as a solid matter.
6. The ink composition as defined in claim 1, wherein said aqueous emulsion has a concentration of said styrene resin-based doughnut-shaped flat particles of 40 to 45 wt%, a viscosity of 15 to 25 cps and a pH of 7.8 to 8.3.
7. The ink composition as defined in claim 1, wherein said composition contains 1 to 40 wt% of a white inorganic pigment.
8. The ink composition as defined in claim 1, wherein said composition contains 0.1 to 30 wt% of a water soluble resin.
9. The ink composition as defined in claim 8, wherein said water-soluble resin is one or more resins selected from the group consisting of polyacrylic acid, polymethacrylic acid, styrene-acrylic copolymer, styrene-maleic copolymer, polymaleic acid, rosin-modified maleic resin and shellac.
10. The ink composition as defined in claim 1, wherein, as a solvent, an aqueous medium is utilized containing 20 or less wt% of at least one solvent selected from the group consisting of lower alcohols, polyhydric alcohols, polyalkylene glycols and alkylene glycol ethers.

* * * * *